T. S. MOUCHET.
PEA PICKER.
APPLICATION FILED MAY 13, 1920.

1,384,626. Patented July 12, 1921.
6 SHEETS—SHEET 1.

Fig. I.

Inventor
T. S. Mouchet.
by Mawhinney & Mawhinney
Attorneys.

Fig. 4.

T. S. MOUCHET.
PEA PICKER.
APPLICATION FILED MAY 13, 1920.

1,384,626.

Patented July 12, 1921.
6 SHEETS—SHEET 5.

Inventor
T. S. Mouchet
by Mawhinney & Mawhinney
Attorneys.

UNITED STATES PATENT OFFICE.

THEODORE S. MOUCHET, OF BOWERSVILLE, GEORGIA, ASSIGNOR TO PERFECT PEA PICKER COMPANY, OF HARTWELL, GEORGIA, A CORPORATION OF GEORGIA.

PEA-PICKER.

1,384,626.     Specification of Letters Patent.     Patented July 12, 1921.

Application filed May 13, 1920. Serial No. 381,117.

*To all whom it may concern:*

Be it known that I, THEODORE S. MOUCHET, a citizen of the United States, residing at Bowersville, in the county of Hart and State of Georgia, have invented new and useful Improvements in Pea-Pickers, of which the following is a specification.

The present invention relates to improvements in pea picking machines or pea harvesters, and has for an object to provide a machine of simple and inexpensive construction which will have a comparatively great capacity for picking peas from vines of various sizes.

Pea vines grow to different sizes not only in different localities, but under the same circumstances and conditions in one field will be found large straggling vines intermingled with short pigmy growths.

The aim of the present invention is to obtain a machine of a character which will admit of quick and convenient adjustability as the same is propelled through a field to meet the various requirements and difficulties found in actual practice due to the varied growths of pea vines.

Another object of the invention is to provide for the gathering of the pea vines into the picking teeth and into the wagon body provided to receive the same and out of the path of the wheels.

With the foregoing and other objects in view, the invention will be more fully hereinafter described in conjunction with the accompanying drawings which show one mechanical embodiment of which the invention is susceptible, and wherein like parts are denoted by like or corresponding reference numerals throughout the several views.

Figure 1:
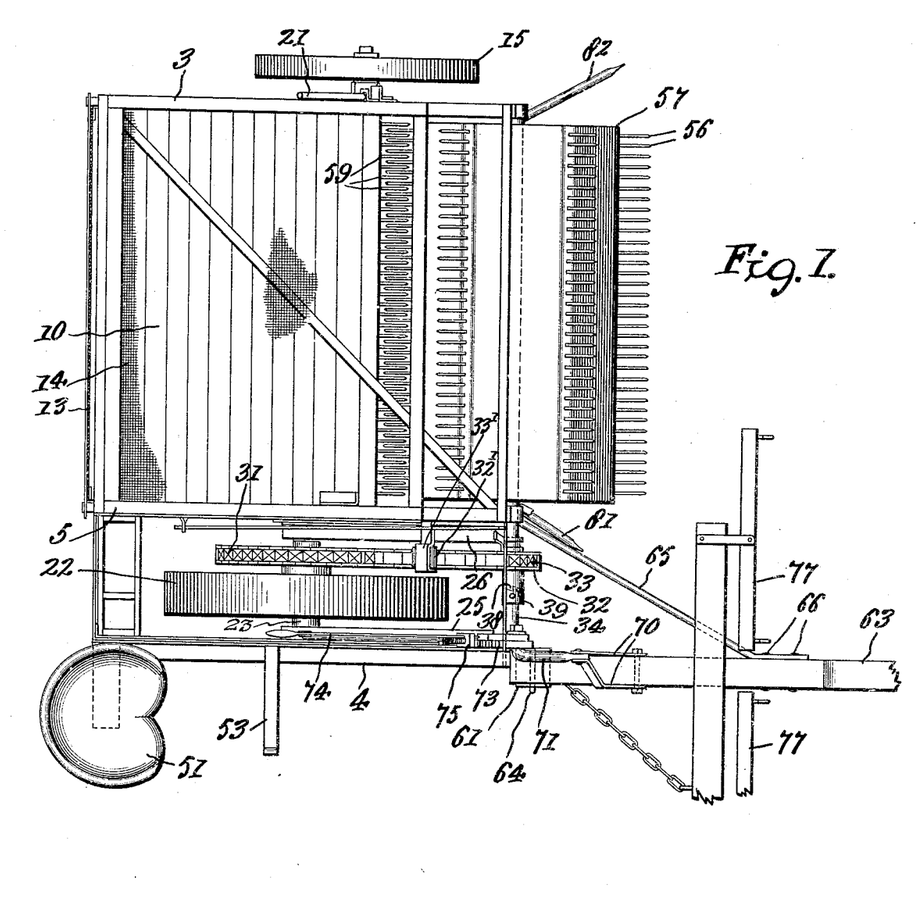
Figure 1 is a top plan view of a pea picking machine constructed in accordance with the present invention.

Referring more particularly to the drawings, the machine is made up of the main frame preferably of angle iron construction and comprising front and rear transversely extending beams 1 and 2 upon which are erected a pair of side frames 3 and 4 and an intermediate frame 5 which, as shown in Fig. 1, lies to one side of the longitudinal center of the machine being closer to the upright side frame 4.

Figure 2:
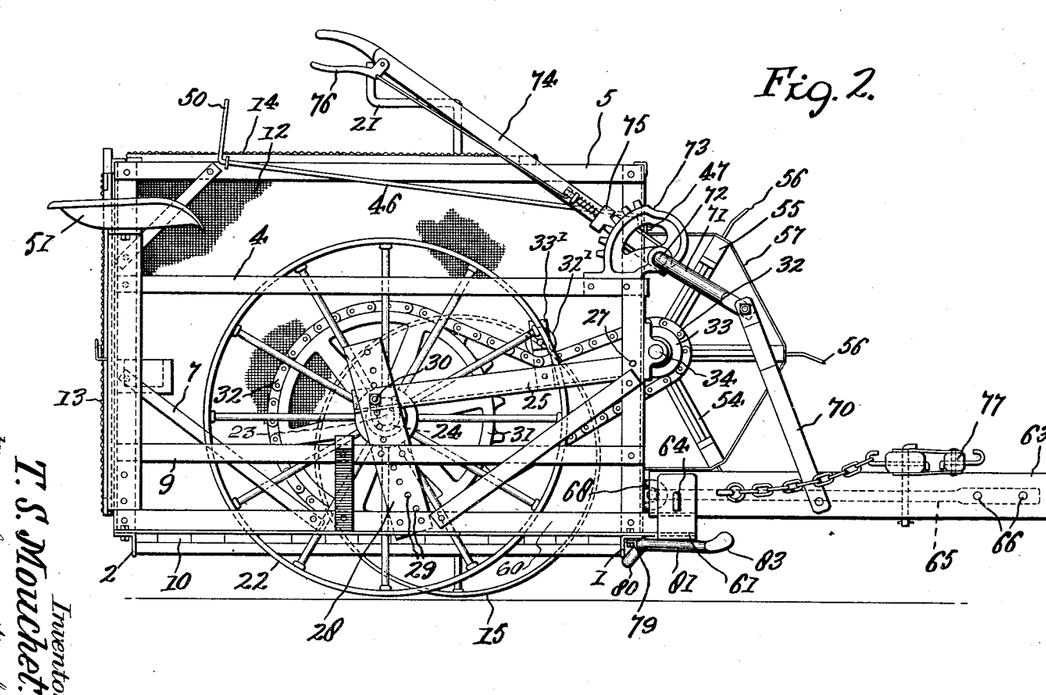
Fig. 2 is a side elevation thereof.
Figure 3:
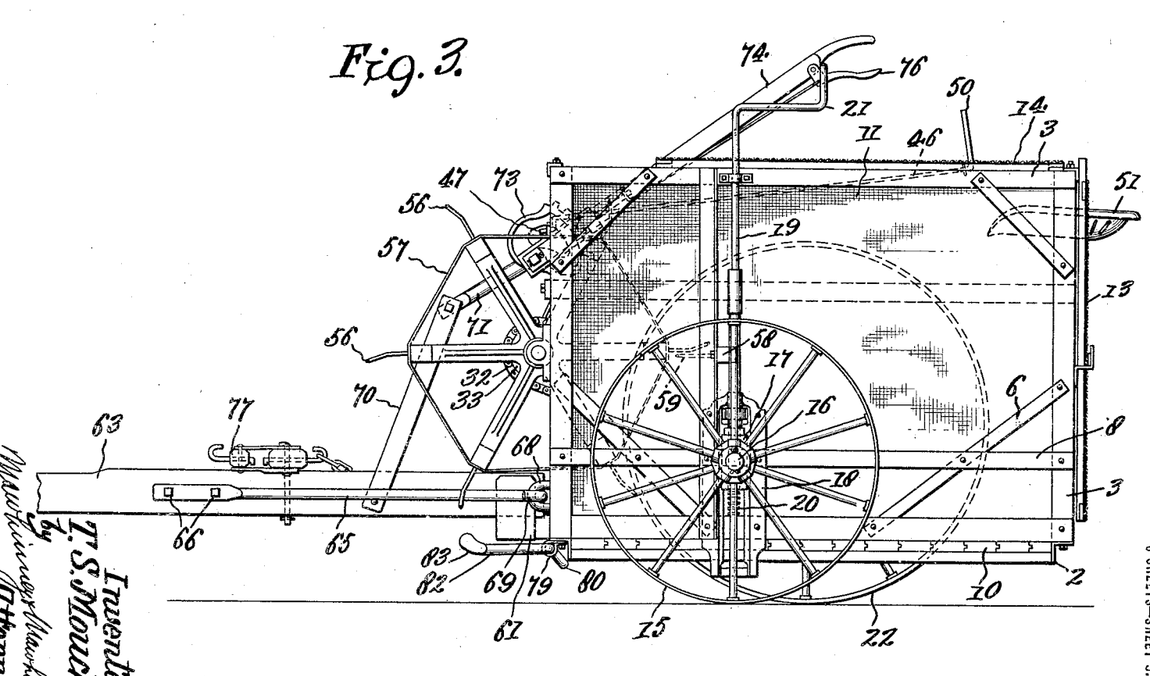
Fig. 3 is a similar view taken from the opposite side of the machine.

The side frames are substantially rectangular as will be understood from inspections of Figs. 2 and 3, and are also with advantage made of angle iron appropriately reinforced by diagonal braces 6 and 7. The side frames also preferably include rails 8 and 9 provided in any suitable number and extending longitudinally of the machine. The rails 8 and 9 are connected between the vertical standards of the side frames.

Between the side frame 3 and the intermediate frame 5 is provided a wagon body having its front portion left open. Floor boards 10 are laid within the wagon body and form an imperforate bottom for the same. The side frame 3 and intermediate frame 5 support wire mesh or screen walls 11 and 12, and in like manner wire mesh or screen 13 and 14 is placed respectively at the rear of the wagon body and the top of the same.

At one side the wagon body is supported by a wheel 15 mounted on an axle 16 which is journaled in a vertically movable block 17 operating in guides 18, which are carried at the side of the wagon body in any suitable manner. A vertical shaft 19 is journaled on the side of the wagon body, and is supplied with a threaded portion 20 engaging through the block 17. Rotation may be imparted to the shaft 19 by a handle 21 extending above the top of the wagon body. By turning the handle 21 the block 17 may be caused to move up or down as a result of which the wagon body is raised or lowered with respect to the field over which it travels.

At its opposite side the main frame and wagon body are supported by a second wheel 22 preferably of greater diameter than the wheel 15 and provided with a tread of increased width, as shown in Fig. 1. This wheel 22 is preferably in the nature of a bull wheel and it is employed to drive the picking mechanism as hereinafter more fully described.

The wheel 22 is mounted on an axle 23 which is relatively short and lies between the side frame 4 and the intermediate frame 5. U-shaped clips 24 embrace the ends of the axle 23 and are removably or otherwise carried by the rear free ends of swinging arms 25 and 26.

The fulcrum or pivot points of these arms 25 and 26 are indicated at 27 in Fig. 2. Plates 28 are secured to the side frame 4 and the intermediate frame 5, each being supplied with a series of perforations 29 arranged in the arc of a circle struck from the fulcrum point 27 as a center. The arms 25 and 26 carry the removable pins or bolts 30 adapted to be engaged with the perforations 29 in the plates 28 in order to hold the wheel 22 in a desired position with respect to the main frame and wagon body.

By disengaging the bolts or pins 30, as, for instance, shown in Fig. 2, the main frame and wagon body may be allowed to descend closer to the ground, the plates 28 and arms 25 and 26 moving relatively. Or, on the other hand, once the pins or bolts 30 are removed, the main frame and wagon body may be lifted to a desired height whereupon the pins or bolts are reinserted in the perforations 29, which are at that time presented to them, and they thus serve to hold the wagon body at the adjusted elevation.

It has been found to be more practicable to have the wheels 15 and 22 adjusted by independent mechanism, and it becomes necessary to have the bull wheel 22 describe a swinging movement during this adjustment in order that the drive chain, later referred to, may at all times be kept taut.

The axle 23 carries a large sprocket 31 engaged by a drive chain 32 which extends forwardly and about a small sprocket 33 loose on the shaft 34 of the picking mechanism. A roller 32' carried by a bracket 33' engages the upper run of the drive chain 32 and acts to tighten the same or take up any slack therein. The bracket 33' is carried by the arm 26, and is movable up and down therewith so as to automatically impose the necessary tension on the chain.

Figure 4:
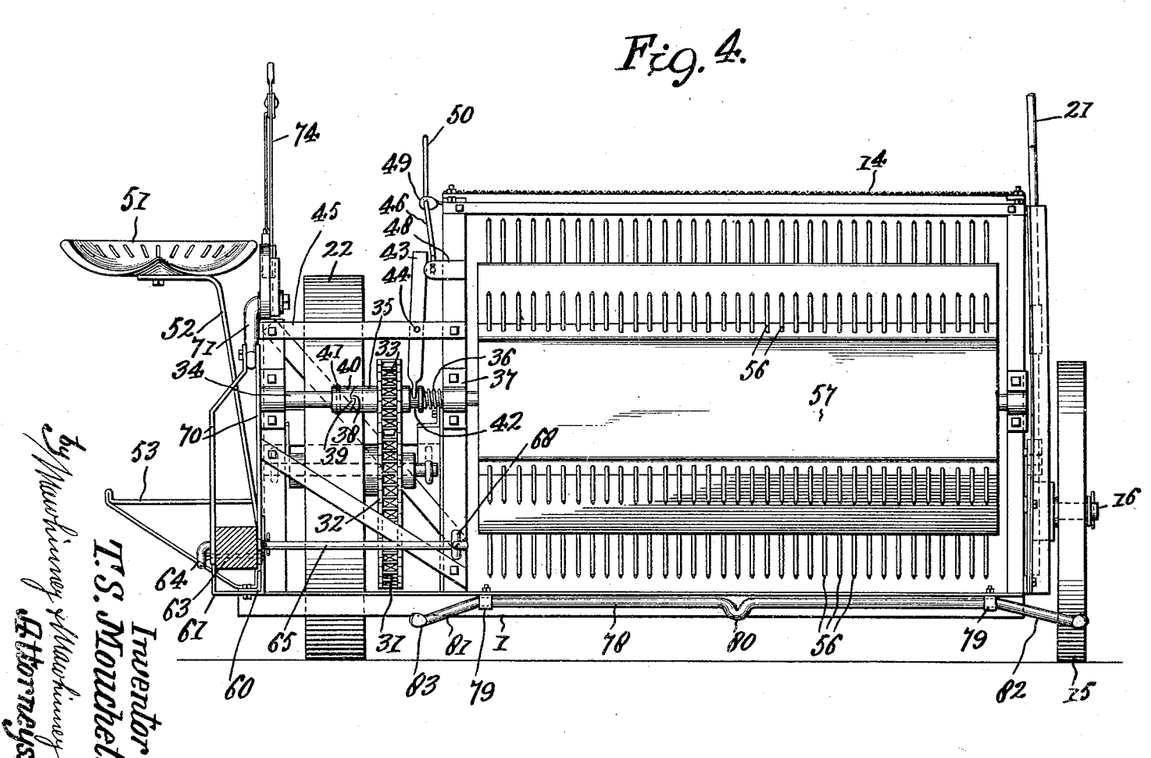
Fig. 4 is a front elevation of the machine.

The shaft 34 is journaled in appropriate bearings affixed to the upright frames 3, 4, and 5. As shown possibly to better advantage in Figs. 1 and 4, the front smaller sprocket 33 is carried by a sleeve 35 capable of turning loosely on the picking shaft 34, and also being free to slide axially along such picking shaft. A coil spring 36 is wound about the picking shaft 34 between one of the bearings 37 and the adjacent end of the sleeve 35. This coil spring is under a condition of potential energy, being confined under compression between these two parts, and therefore normally acting to shift the sleeve 35 toward the side frame 4, in which position clutch teeth 38 provided at the outer end of the sleeve 35 are made to yieldingly engage with companion clutch teeth 39 on a collar 40 secured as by a pin 41 to the picking shaft 34.

The sleeve 35 is formed with a groove 42 at its end adjacent the spring 36 which is occupied by the forked lower end of a lever 43 swinging about a pivot point 44 on a cross piece 45 extending between the upright frames 4 and 5.

The upper end of the lever 43 is disposed close to a rod 46 having its forward end 47 offset downwardly and journaled in a bracket 48 extending laterally from the intermediate frame 5. The rear end of the rod 46 is journaled to oscillate in a bracket 49 beyond which the rod is upturned to provide an operating handle 50.

A seat 51 is supported to one side of the upright frame 4 so that the occupant of the seat may be in a convenient position to grasp the handle 50 and disconnect the clutch so as to discontinue the operation of the picking mechanism whenever desired. The seat 51 is supported on a spring 52 which extends down in a vertical direction and is secured in any appropriate manner to the side frame 4.

A foot rest or stirrup 53 of a suitable character and construction is also supported by the side frame 4 just forward of the seat 51.

The picking shaft 34 between the side frame 3 and the intermediate frame 5 and at the open front portion of the wagon body receives a drum composed of arms 54 rotating about the picking shaft 34 and carrying at their outer ends transversely extending beams 55 to which are secured rows of bent picking teeth 56.

Sheet metal or other plates 57 are secured to the beams 55 in order to inclose the spaces between the arms 54 and avoid the entrance of vines or other foreign matter into the center of the drum and into the movable parts of the apparatus.

The picking drum is intended to be rotated in a clockwise direction from the viewpoint of Fig. 2 or in a counterclockwise direction as viewed from Fig. 3. This is accomplished whenever the machine is put into motion by the automatic action of the chain drive 32.

Within the wagon body, as best shown in Figs. 1 and 3, is mounted a comb 58 having teeth 59 projecting forwardly. The comb is so positioned and constructed that the teeth 59 thereof will engage between the picking teeth 56 as the drum rotates. The action of the comb 58 will therefore be a cleansing one designed to free the picking teeth from portions of the vines and other foreign matter which may have a tendency to cling thereto, and which would otherwise interfere with the efficient action of the picking mechanism and the proper progress of the operation.

As best seen in Fig. 3, the comb 58 is placed at an elevation which will avoid its interference with the raking in of the peas by the action of the teeth 56, the peas being pushed back by this mechanism into the open front portion of the wagon body and toward the rear of the same.

Figures 7, 8, 9:
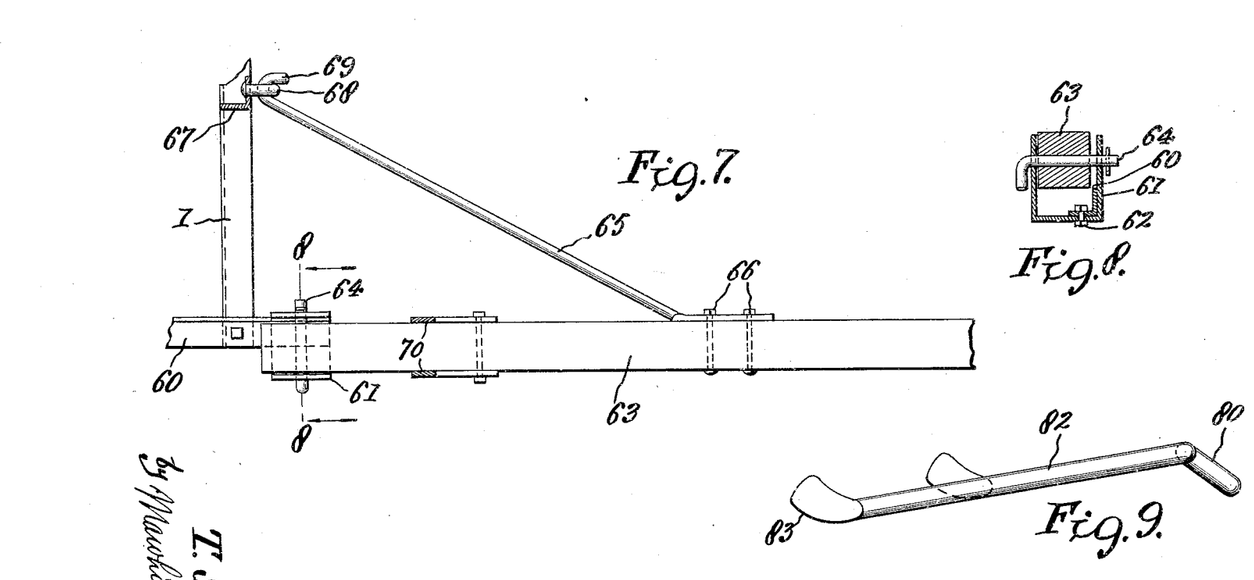
Fig. 7 is a fragmentary plan view of the draft pole and its connection with the main frame.
Fig. 8 is a transverse sectional view taken on the line 8—8 in Fig. 7.
Fig. 9 is an edge view of the gathering mechanism.

The angle rail 60 at the base of the upright side frame 4 is continued forwardly as indicated in Figs. 2 and 7 and extends beyond the front beam 1 of the main frame where it is received in a U-shaped clip 61 and fastened as by a bolt 62. The clip 61 receives a draft pole 63 which is pivoted therein on a transverse pin 64, the pin being preferably made removable so that the draft pole may be disconnected.

Figure 5:
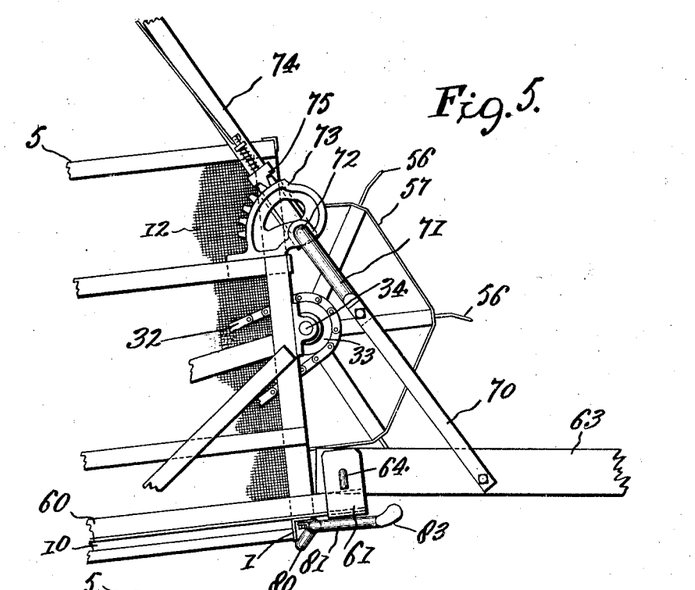
Fig. 5 is a fragmentary side view showing the wagon body and picking mechanism in an elevated position.
Figure 6:
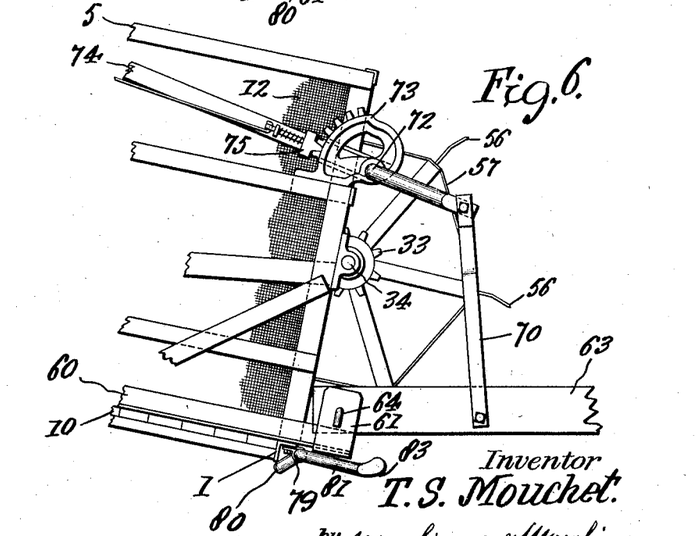
Fig. 6 is a similar view showing these parts in a lowered position.

A brace 65 is secured as by bolts 66 to the draft pole 63 forwardly of the clip 61 and extends diagonally rearward to a point just in front of the intermediate frame 5. The upright rail 67 of the intermediate frame 5, as shown in Fig. 7, is provided with an eye 68 which is engaged by a hook 69 bent from the rear end of the brace 65. The connection between this hook and eye is a loose one in order to allow of the swinging movement of the main frame and wagon body about the axles of the wheels 15 and 22, as illustrated in Figs. 5 and 6.

Between the bolts 66 and the clip 61 a pair of arms 70 are connected to the draft pole 63, they being secured at their upper ends to a crank 71 turning about a center 72 associated with which is a rack segment 73.

A lever 74 is connected to the crank center 72 and is in connection to turn the crank 71 as the lever 74 is swung in the one or the other direction.

A latch 75 is carried by the lever 74 and is urged by spring pressure to engage the teeth of the segment 73 for the purpose of locking the lever 74 in its adjusted position. A latch release 76 is supplied on the lever 74 to withdraw the latch when it is desired to swing the lever. The handle of the lever 74 is disposed in a convenient position for ready operation by the occupant of the driver's seat 51.

The pea picking machine may be propelled through the field in any desired way as by draft animals, a tractor, or a self-contained plant, but in the present instance, for the purpose of illustration, swingle-trees 77 are illustrated to which horses, mules, or other draft animals may be hitched, and by which the machine is pulled through the field, the animals traveling at the side of the rows of vines.

Figure 10:
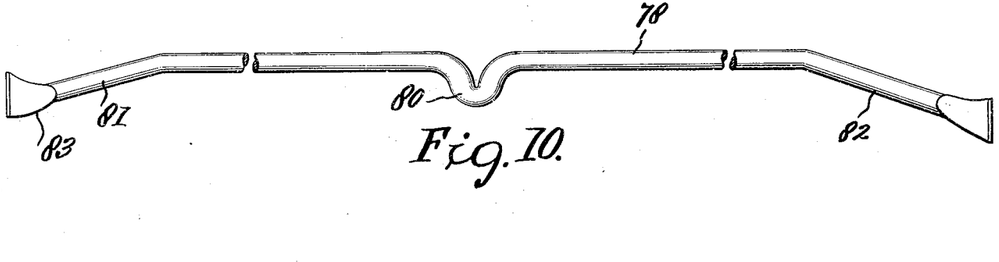
Fig. 10 is a front view of the same.

It is also desirable to have some mechanism for gathering the pea vines toward the forward open end of the wagon body and into the picking teeth 56. This mechanism also serves to remove the pea vines from the path of the wheel 15 which travels between adjacent rows. This mechanism is illustrated in detail in Figs. 9 and 10, and comprises a rod 78 journaled in the straps 79 held beneath the forward open end of the wagon body.

The rod 78 is free to oscillate in the straps 79, it being provided with a crimped central portion 80 which engages with a portion of the framework as indicated in Figs. 5 and 6, and in this way the downward swinging of the rod is limited.

Outwardly flaring or divergent arms 81 and 82 are bent from the ends of the rod 78 and, as shown in Fig. 1, the arm 82 extends in the path of the wheel 15. Due to the inclination given the same, it will first engage the vines that may lie close to the ground in front of the wheel 15 and will lift them and guide them toward the picking mechanism and the wagon body. In this way great numbers of peas are saved which would otherwise be destroyed by the wheel 15 traveling over and crushing them.

The extremities of the arms 81 and 82 are bent upwardly and formed with rounded under-sides 83 so that when encountering obstructions in the course of travel, the arms will be forced upwardly causing the rod 78 to swing in the straps 79. By reason of this upward yielding of the arms the same do not offer that rigid resistance to obstructions that would oftentimes result in breakage. This swinging movement of these parts is also advantageous in that when the front portion of the wagon body is caused to dip down, as shown in Fig. 6, the ends of the arms 81 and 82 may yield upwardly by reason of the contact of the same with the ground.

This coöperation between the swinging of the wagon body and the gathering mechanism is important inasmuch as the gatherers are all at times in an operative position in readiness to fulfil their functions irrespective of the vertical adjustment of the wagon body and the latter may be swung down very close to the ground to catch low growths, the gathering arms permitting of this by reason of their capability of yielding in an upward direction.

In the operation of the machine, draft animals are hitched to the draft pole 63 and the machine is drawn along through the field. The drive chain 32 will, of course, rotate the picking drum and the teeth 56 thereof will cut through the vines and strip the peas therefrom, at the same time sweeping them backwardly into the wagon body which provides a large space for their reception and storage.

The operator occupying the seat 51 may at all times observe the progress of the operation through the mesh walls of the wagon body, and these mesh further allow dust to pass therethrough and be separated from the peas. As the machine progresses through the field the gathering arms 81 and 82 engage plants that have been trampled down or would otherwise escape the action of the picking mechanism and are apt to be mashed by the passage thereover of the wheel 15. The condition of the growth of the plants in a field is first inspected, and a rough adjustment of the height of the wagon body and main frame is first made by the adjusting mechanism associated with the supporting wheels 15 and 22. However this is in the nature of a permanent adjustment and cannot be varied while the machine is in progress. This adjustment is therefore not capable of taking care of vines of both low and high growth as they are apt to exist in the same field.

This difficulty is avoided by the operator manipulating the hand lever 74 by which he is able to tilt the main frame and the wagon body together with the picking drum about the wheels 15 and 22. This action is shown in Figs. 5 and 6.

When the lever 74 is swung forwardly the crank 71 is moved down as are also the arms 70 and the forward end of the wagon body is tilted upwardly about the pivotal connection of the draft pole 63.

Thus the wagon body and draft pole together break upwardly. Such action is accompanied by a raising of the picking mechanism and the front open portion of the wagon body to accommodate vines of a high growth. Should vines of a low growth be subsequently met with the operator may swing the lever 74 rearwardly and downwardly causing the lifting of the crank 71 and arms 70, and causing the draft pole and front portion of the main frame and wagon body to break downwardly, thus bringing the apparatus very close to the ground. The operation of this adjusting mechanism is such that an operator may quickly and conveniently raise and lower the picking mechanism as required by the growths met with.

In going to and from the field it is desirable to suspend the action of the picking apparatus, and for this purpose the operator occupying the seat 51 may have recourse to the hand piece 50. By drawing this piece toward him the rod 46 will be caused to move against the lever 43 swinging the same and causing the clutch sleeve 35 together with the sprocket wheel 33 to be moved inwardly in opposition to the action of the coil spring 36.

The teeth 38 and 39 of the clutch will thus be disengaged. No motion will therefore be transmitted to the picking shaft 34, the sprocket 33 simply idling about such shaft.

The comb 58 serves the purpose of keeping the peas from being carried on around by the teeth of the drum and slung out. This is one of the main purposes of the comb as well as to clean the teeth of the drum of foreign matter.

I have described preferred and satisfactory constructions, but it will be obvious that various changes and modifications may be made without departing from the spirit of the invention provided such changes fall within the scope of the appended claims.

What is claimed is:

1. In a pea picking machine, a vehicle having a container space for the peas, picking means carried by said vehicle, and a rod pivoted on said vehicle beneath the picking means and having forwardly extending divergent arms bent from the ends thereof for gathering in the vines.

2. In a pea picker, a vehicle having a space to receive the peas, picking means carried by said vehicle, and a rod pivoted on the front portion of the vehicle beneath said picking means and provided with forwardly extending and divergent arms adapted to gather in the vines, said arms provided at their forward free ends with curved under surfaces.

3. In a pea picking machine, a vehicle having a container space for the peas, picking means carried by said vehicle, and a rod pivoted beneath said picking means on the vehicle and having arms extending forwardly for gathering in the vines, said arms having upturned free forward ends, said rod provided with stop means for limiting the downward swinging movement of the arms.

4. In a pea picker, a wagon body provided with mesh walls having its front end left open, a drum journaled to rotate at the open end of said wagon body and having pins extending therefrom with their ends bent forwardly in the direction of rotation of the drum, means to drive said drum, an extension frame at the side of the wagon body, a draft pole pivoted to said extension frame, means carried by said extension frame and connected to the pole for raising and lowering the front of the wagon body, and gathering means on the wagon body located beneath said drum and having divergent arms adapted to swing substantially vertically and provided with upturned free forward ends adapted to ride over the surface of the ground when the wagon body is moved to a low elevation, said arms being free to swing upwardly in encountering raised portions of the ground.

5. In a pea picker, a wagon body of substantial depth having its bottom extending close to the ground, wheels supporting said wagon body, mesh walls for said wagon body, the front of the wagon body being left open, a picking drum journaled at the open end of the wagon body and provided with radially extending pins bent forwardly in the direction of rotation of the drum, an extension frame extending at one side of said wagon body, means carried by said extension frame for rotating the drum, a draft pole pivotally attached to the extension frame, means carried by the extension frame and connected to said draft pole for raising and lowering the front of the wagon body, and gathering means pivoted on said wagon body beneath the drum and having divergent arms extending forwardly with upturned ends, said gathering means provided with a stop limiting the downward swinging movement of the arms, said arms being normally out of contact with the ground but adapted to move into engagement with the same when the front portion of the wagon body is swung to a low point.

6. In a pea picker, a wagon body having an open end, a drum extending across substantially the entire width of the open end of the wagon body and provided with rows of radially extending teeth, an extension frame at the side of the wagon body, wheels for supporting said wagon body and extension frame, drive means connected to one of the wheels for rotating said drum, clutch means between said drive means and drum, a seat on the extension, actuating means for the clutch means arranged near the seat, a draft pole pivoted to the extension frame, means on the extension frame arranged for operation from the seat and connected to said draft pole for raising and lowering the front of the wagon body, brace means for the pole pivoted to the wagon body at one side of the open end thereof, and gathering means pivoted to the wagon body beneath the drum and having forwardly extending divergent arms normally out of contact with the ground but adapted to move into engagement therewith when the front end of the wagon body is swung to a low point, the outer ends of said arms having curved under faces, and stop means for limiting the downward movement of the arms.

7. In a pea picking machine, a wagon body, movable picking means arranged to rake the peas into the wagon body, means whereby the front portion of the wagon body may be raised and lowered, and a rod pivotally supported at the lower portion of the front of the wagon body and having divergent arms at its ends provided with curved faces at their ends, said rod provided with a rearwardly crimped portion acting as a stop to limit the downward swinging of the arms.

8. In a pea picking machine, a wagon body having an open front portion, picking means mounted at the front portion of the wagon body, actuating means for said picking means, means to raise and lower the open front portion of the wagon body to accommodate vines of different heights, and pivotally mounted guides for directing the vines in toward the picking means to the open front portion of the wagon body, and being free of adjustment whereby said guides may freely swing upwardly whenever encountering obstacles.

9. In a pea picking machine, a wagon body having a forward open end, means for supporting said wagon body for movement and permitting the wagon body to swing in a direction coincident with the path of travel, picking means at the front open end of the body, drive means for the picking means, a rod journaled to oscillate beneath the front open portion of the wagon body and having a crimped portion adapted to engage a part of the machine to limit the movement of the rod in one direction, and arms projecting forwardly in divergent relation for gathering the vines toward the picking means and into the open front of the wagon body, said arms being movable upwardly and having curved under-faces at their forward free ends.

10. In a pea picking machine, a wheeled wagon body having an open front portion, picking means in the front portion, drive means for the picking means, means to raise and lower the front open portion of the body, a rod pivoted to oscillate beneath the front open portion of the body and having a stop to limit the movement thereof in one direction, flaring arms on the ends of said rod, one of said arms projecting in the path of one of the wheels of the machine and acting to gather the pea vines from the path thereof, said arms adapted to swing upwardly when encountering obstacles.

THEODORE S. MOUCHET.